March 15, 1960 L. H. GERNERT 2,928,906

MAGNETIC TRANSDUCING HEAD WITH INTEGRAL ADJUSTMENT MEANS

Filed Oct. 18, 1954 3 Sheets-Sheet 1

INVENTOR

LAWRENCE H. GERNERT

BY William L. Glover

AGENT

INVENTOR
LAWRENCE H. GERNERT
BY William L. Glover
AGENT

March 15, 1960 L. H. GERNERT 2,928,906

MAGNETIC TRANSDUCING HEAD WITH INTEGRAL ADJUSTMENT MEANS

Filed Oct. 18, 1954 3 Sheets-Sheet 3

INVENTOR
LAWRENCE H. GERNERT
BY William S. Glover
AGENT 2,928,906
Patented Mar. 15, 1960

2,928,906

MAGNETIC TRANSDUCING HEAD WITH INTEGRAL ADJUSTMENT MEANS

Lawrence H. Gernert, Chatham, N.J., assignor to Monroe Calculating Machine Company, Orange, N.J., a corporation of Delaware Application October 18, 1954, Serial No. 462,732
1 Claim. (Cl. 179—100.2)

This invention relates to magnetic recording and more particularly to a magnetic transducing head for use in magnetic data storage systems and the method of manufacturing the same.

Magnetic drums and the like are used extensively in electronic data processing equipment for storage of digital data. Data is recorded on these drums in the form of magnetized spots; actual recording usually is accomplished by applying a strong signal to a transducing head located in close proximity to the surface of the drum. Data thus recorded may be played back later by the same transducing head or by another head aligned with the same recording channel. Playback of the data is accomplished by moving the magnetized spots past the transducing head to induce a current therein which can be transformed into a voltage signal or the like. The effect of each spot on the transducing head is extremely minute and it is of great importance that the heads be sufficiently sensitive to produce a recognizable signal in response thereto, which can be amplified for further usage.

Frequently, one or more recording channels of a drum are utilized for the purpose of effecting a specific time delay of data during operations of the processing equipment rather than for permanent storage of the data. In this application, two transducing heads are associated with the delay channel; the one to record data in the channel and the other to play it back. The two heads are located in the precise angular positions relative to the drum required to afford the desired delay.

Satisfactory transducing heads are known as are adjustable mounting means which may be associated with such heads to position the same a desired distance from the surface of a drum and in a precise angular position relative to the latter. However, the known heads and adjustment means are extremely costly and are extremely space consuming. Evidently, in systems wherein a great number of heads are utilized the high cost of the latter substantially increases the cost of the system and where, as is usually the case, space is at a premium, large heads and expansive adjustable mounting means therefore are undesirable.

The principal object of the invention, therefore, is the provision of a magnetic transducing head having desirable magnetic characteristics, which is self-adjustable radially and angularly with respect to the recording medium with which it is to cooperate, which is comparatively inexpensive and which requires a minimum of space.

Other objects and features of the invention will become apparent from the following description when read in the light of the attached drawings, of which Fig. 1 is a fragmentary side elevation of the magnetic transducing head of the invention;

Figure 1:
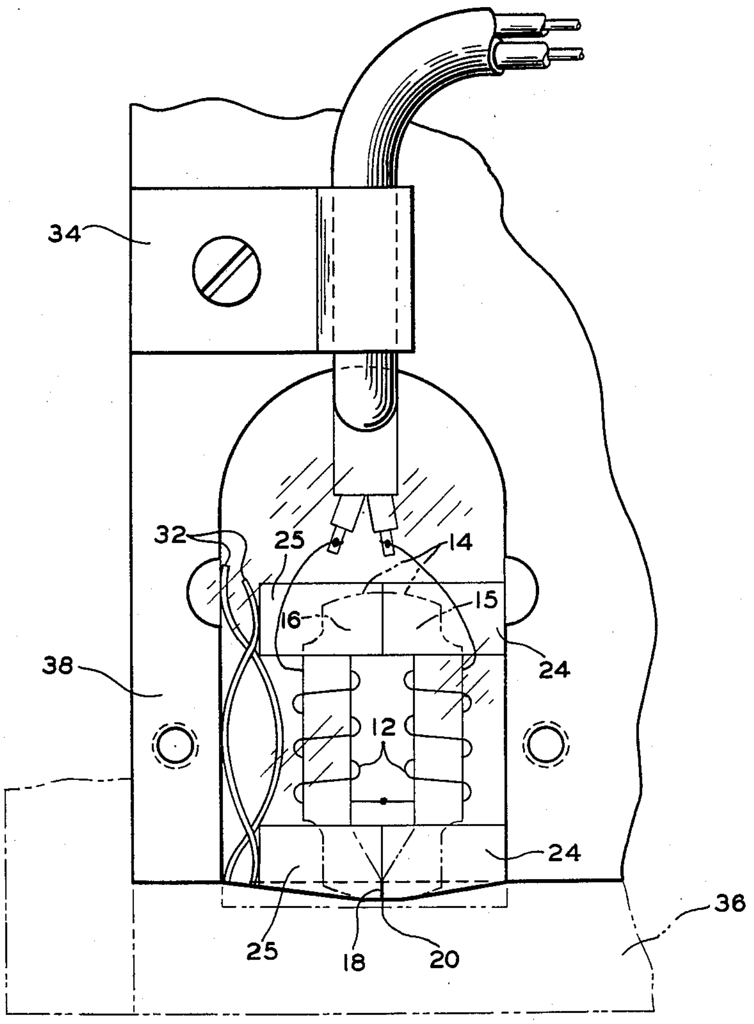

As used herein, the term "transducing head" refers to either a means for converting an electric current varying with time into a time varying magnetic field through which a magnetizable record means is passed, or to a means for converting a magnetic field varying with time into a time varying electric current.

The magnetic transducing head of the invention includes (Fig. 1) a pair of serially connected coils 12 wound on opposite legs of a core 14. Core 14 is composed of approximately C-shaped, oppositely disposed pole pieces 15 and 16 of a suitable magnetic material such as ferrite having their one ends abutting and their other ends separated by a shim 18 of a non-magnetic material such as silver, to form a gap 20. In order to obtain optimum results the shim 18 should be of the same size as the opposing faces of the pole pieces 15 and 16 which are in contact therewith, that is, no overlap of the shim should exist.

Figure 4:
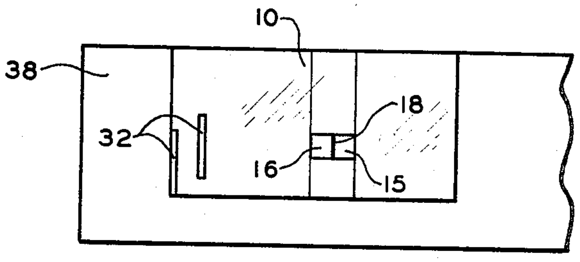
Fig. 4 is an elevational view of the head of Fig. 1 as viewed from beneath in that figure.

Pole pieces 15 and 16 are embedded in a plastic block 10 molded directly in a mounting and adjustment member 38 (Figs. 1 and 4). Preferably member 38 provides for radial and precessional adjustment of the head relative to the recording medium with which the head is to cooperate, although, if desired, the provision for precessional adjustment may be eliminated.

The method of constructing the transducing head of the invention will now be described.

Figure 2:
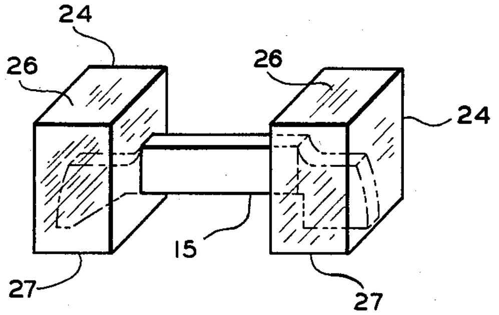
Fig. 2 is an isometric view of a portion of the head of Fig. 1 during the process of constructing the same.
Figure 3:
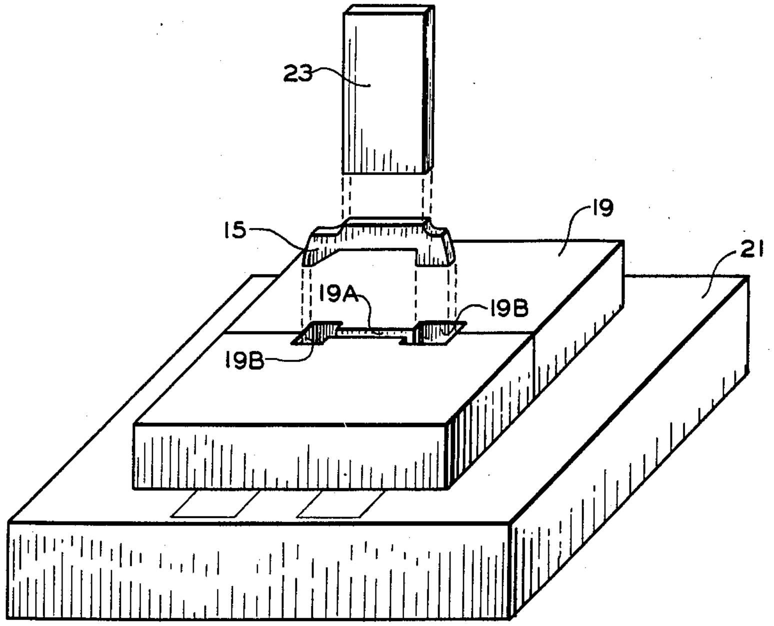
Fig. 3 is an isometric view of molding means for forming the structure illustrated in Fig. 2.

The first step in the manufacture of the head is to mold end supporting blocks 24 and 25 on pole pieces 15 and 16, as shown in Figs. 1 and 2, utilizing a mold 19, such as that shown in Fig. 3, for this purpose. Initially, pole piece 15 or 16 is inserted into a mold 19 comprising a pair of blocks of magnetic material which when placed in abutting relationship produce a molding cavity having a narrow central portion 19A of substantially the same thickness as a core 15 or 16 and thicker, cube-like end portions 19B. Mold 19 is positioned atop a permanent magnet 21 which serves to retain the two halves thereof in the proper abutting relationship and to hold the pole pieces securely in place during molding to prevent any of the plastic material from seeping beneath the pole piece ends in the molding cubes 19B. The plastic material is poured into each of the end cubes 19B. A slug 23 is then inserted on top of pole piece 15 or 16 to prevent the plastic from flowing over the latter. Preferably, the plastic material utilized in the molding process is an epoxy resin, or the like. In order to facilitate removal of the molded product from the mold, the faces of the latter and of the magnet 21 and slug 23 which are contacted by the plastic are precoated with a suitable releasing agent such as Dow Corning #7.

The end blocks 24 and 25 serve to isolate pole pieces 15 and 16 from the floor of a cavity 22 in the mounting and adjustment member 38 wherein they are positioned during a later stage of the manufacturing process (Figs. 1 and 4) and, also, to provide end limits for the coils 11 during the winding thereof.

After the blocks 24 and 25 have been molded on pole pieces 15 and 16 respectively, that face of each block 24 which was uppermost in the mold 19, i.e. faces 26 in Fig. 2, is machined to provide a predetermined dimension between it and the opposite face 27 of the block and to insure parallelisim between the two. The pole piece 15 can then be placed in mold cavity 22 with the faces 26 of its end blocks 24 against the right hand wall of the cavity, as shown in Fig. 1, to locate the shim 18 accurately relative to member 38.

Next, the end faces of the pole pieces are checked to ascertain that no plastic material has adhered thereto, and, if any has it is carefully removed.

When the end blocks 24 have been machined the portions of the pole pieces 15 and 16 extending between their end blocks are insulated as by wrapping several layers of an insulating material such as Japanese tissue thereon and bonding the same with a high dielectric adhesive such as Glyptal. The coils 12 are then wound on the pole pieces between the end blocks, with their one ends connected together and their other ends connected to leads 13. Coils of 300 turns of No. 42 copper wire have been found satisfactory.

The pole pieces 15 and 16 are then placed in the cavity 22 of member 38 with their one ends abutting and their other ends separated by shim 18. The machined faces 26 of end blocks 24 are, of course, positioned against the right hand wall of cavity 22 and in order for the pole piece to cooperate properly with the recording medium with which the head is to be associated, the ends of the pole pieces separated by shim 18 end beyond the open end of the cavity, as shown in Fig. 1. The assembly is then temporarily secured in position in the cavity by a pair of non-magnetic interlocking spring clips, or the like, 32, compressed between the end blocks 25 and the left hand wall of the cavity. The lead wires 13 are next secured by a cable clamp 34 affixed to member 38 by a screw 35.

In order to secure the parts in position in the cavity 22 permanently, a cap mold 36 is used to dam the open end of cavity 22 allownig for the projection of the shimmed ends of pole pieces 15 and 16 beyond the confines of said cavity, as shown diagrammatically in Fig. 1. A plastic material, such as an epoxy resin, is then poured into the cavity 22 to form the block 10 mentioned above.

Curing of the end blocks 24 and 25 and of the block 10 can be hastened by baking the same while still in their molds. Baking at a temperature of approximately one hundred degrees Fahrenheit for twenty-four hours or more, has been found satisfactory.

When the block 10 has cured, the portion thereof which projects from the open end of cavity 22 is bevel ground until the desired projection of pole pieces 15, 16 and shim 18 is attained.

It will be understood, of course, that fabrication of the mounting and adjustment member 38 is accomplished prior to that of block 10 which uses cavity 22 of said member as its permanent housing as described above. Member 38 is constructed of a non-magnetic material possessing a relatively high degree of resilience, such as unleaded naval brass. Preferably, in forming the cavity 22 in the member, the side walls thereof are provided with fillets 40, or the like, to prevent any accidental dislodgement of the block 10 once it has been molded therein.

Figure 5:
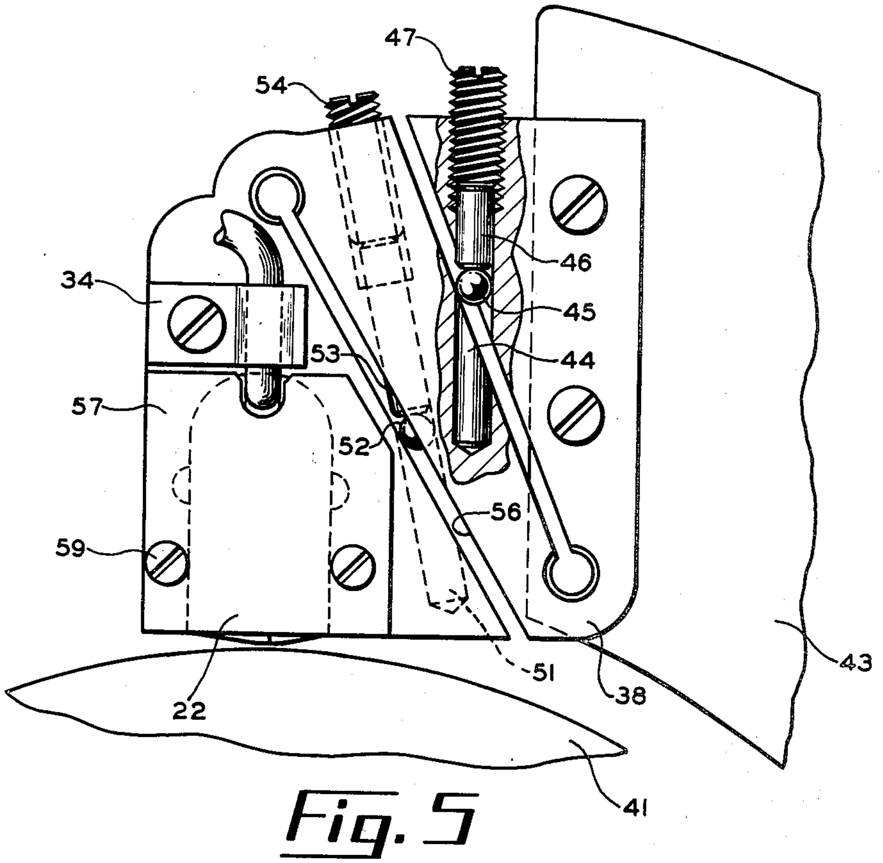
Fig. 5 is a side elevational view of the head of the invention with certain parts broken away more clearly to show the construction.

The member 38 is positioned in close proximity to the surface of a recording medium such as a magnetic drum 41 by bolting or otherwise securing the same to a suitable frame piece 43 (Fig. 5). In order to provide for radial adjustment of the pole pieces 15 and 16 relative to the recording medium a diagonal slot 49 divides member 38 into two sections of which one is affixed to the frame member 43 and the other embodies the cavity 22. The slot 49 extends from the edge of member 38 furthest from the recording medium 41 toward the edge nearest the latter from which the pole pieces 15 and 16 project, but diagonally away from said pole pieces to a point adjacent the far corner of said edge. Sufficient material is left, beyond the end of the slot in said corner to constrain the opposing faces of the slot to parallelism from a desired range of angular positions to which they may be adjusted.

In order to adjust the angular relations of the opposing faces of slot 49 a screw 47 is threaded into a tapped hole 42 which extends from the edge of member 38 furthest away from the recording medium across the slot 49. A pin 44 is fixed in that portion of the hole beyond the slot 49 and provides a bearing surface for a ball bearing 45. Preferably, the pin 44 is inserted in the hole 42 before the slot 49 is cut so that the pin is cut with the latter to provide an accurate inclined plane for the ball 45 to operate against. Ball 45 is held against the inclined plate by screw 47 which acts through an adjustment pin 46 located between the two.

The construction is such that rotation of screw 47 acting through pin 46 and ball 45 adjusts the angular relation between the opposing faces of slot 49 and in so doing swings the pole pieces 15 and 16 toward and away from the surface of drum 41 on an arc centered about the closed end of slot 49. Evidently, the closed end of the slot should be located as close as possible to the edge of member 38 from which the pole pieces 15 and 16 project to obtain a minimum of angular movement of the pole pieces relative to the drum.

In order to provide for angular adjustment of the pole pieces 15 and 16 relative to the drum 41, member 38 is provided with a second slot 56 which extends from the edge of the member closest the recording medium at a point adjacent the closed end of slot 49, diagonally across the member to a point in line with the shim 18 between the pole pieces 15 and 16. This alignment of the closed end of the slot with the shim 18 provides for a minimum movement of the pole pieces toward and away from the drum 41 as their angular position is adjusted. Again, sufficient material is left beyond the closed end of the slot to constrain the opposing faces of the slot to parallelism from a desired range of angular positions to which they may be adjusted. Like the slot 49, the angular relation of the opposing faces of slot 56 are adjustable by means of a screw 54, adjustment pins 53 and a ball bearing 52 which cooperates with the inclined face of a pin 51.

The construction is such that rotation of screw 54 varies the angular relation between the opposing faces of slot 56 and swings the pole pieces 15 and 16 toward and away from the drum on an arc centered about the closed end of said slot.

The angles on which the slots 49 and 52 are cut and the angular positions of the adjusting screws 47 and 54 relative thereto, are dependent upon the amount of adjustment that is desired and the amount of rotation of the said screws that it is desired to effect a selected amount of adjustment.

In order to provide additional magnetic shielding for the transducing head of the invention a cover plate 57, of brass or other suitable shielding material (Fig. 5) is secured in place over the cavity 22 by screws 59.

It will be seen, therefore, that there has been provided a novel magnetic transducing head which is self-adjustable radially and angularly with respect to the recording medium with which it is to cooperate.

While there has been above described but a single embodiment of the invention, many changes therefor and additions thereto can be made without departing from the spirit of the invention and it is not desired, therefore, to limit the scope of the invention except as pointed out in the appended claim or as dictated by the prior arts.

I claim:

An adjustable support for a magnetic transducing head cooperating with a magnetic medium comprising a rectangular plate, means supporting said plate along one end thereof with one edge of said plate adjacent the magnetic recording medium, a slot in said plate extending from a point adjacent the corner of said plate bounded by said one edge and said one end diagonally away from said one end to the opposite edge and opening on said opposite edge, a second slot substantially parallel with said first slot but opening onto said one edge of said plate and independent means for varying the widths of the openings of said first and second slots including a hole substantially parallel to said one end of the plate extending from the opposite edge of said plate across said first slot, a second hole substantially parallel to said first hole extending from the opposite edge of said plate across said second slot, each hole having a bearing pin secured therein on the side of the respective slot farthest from the opposite edge of said plate, a ball bearing in the hole engaging said pin, an adjustment screw threaded into the hole and an intermediate pin located between the ball and the adjustment screw, whereby variation of the width of said first slot adjusts said one edge toward or away from the recording medium while variation of the width of said second slot adjusts said one edge along the recording medium.

References Cited in the file of this patent

UNITED STATES PATENTS

| | | |
|---|---|---|
| 1,416,832 | Johansson | May 23, 1922 |
| 2,211,039 | Welter | Aug. 13, 1940 |
| 2,456,767 | Camras | Dec. 21, 1948 |
| 2,553,699 | Brodin | May 22, 1951 |
| 2,612,681 | Camras | Oct. 7, 1952 |
| 2,715,659 | Ibuka | Aug. 16, 1955 |
| 2,769,037 | Dank | Oct. 30, 1956 |
| 2,864,892 | Perkins | Dec. 16, 1958 |